United States Patent [19]

Liberty

[11] 4,143,407

[45] Mar. 6, 1979

[54] MAGNETIC DATA STORAGE AND RETRIEVAL SYSTEM

[75] Inventor: R. John Liberty, Playa Del Rey, Calif.

[73] Assignee: TRW Inc., Los Angeles, Calif.

[21] Appl. No.: 807,578

[22] Filed: Jun. 17, 1977

[51] Int. Cl.² .............................................. G11B 5/09
[52] U.S. Cl. .............................................. 360/51
[58] Field of Search .............................. 360/51, 27

[56] References Cited

U.S. PATENT DOCUMENTS

| | | | |
|---|---|---|---|
| 3,208,057 | 9/1965 | Applequist et al. | 360/51 |
| 3,382,492 | 5/1968 | Santana | 360/51 |
| 3,577,132 | 5/1971 | Anderson et al. | 360/51 |
| 3,653,009 | 3/1972 | Krause | 360/51 |
| 3,689,903 | 9/1972 | Agrawelz et al. | 360/51 |
| 3,755,798 | 8/1973 | Aguirre | 360/51 |
| 3,810,234 | 5/1974 | Monett | 360/51 |
| 3,887,942 | 6/1975 | Horowitz | 360/51 |
| 3,982,277 | 9/1976 | Naylor | 360/51 |
| 4,008,488 | 2/1977 | Osborne | 360/51 |
| 4,053,944 | 10/1977 | Dixon | 360/51 |

Primary Examiner—Vincent P. Canney
Attorney, Agent, or Firm—Martin R. Horn

[57] ABSTRACT

A system for recording and retrieval of data consisting of a data storage means having a pre-recorded signal imposed thereon, data recording and playback means, and a control means. The control means is coupled to the recording and playback means so that it receives the pre-recorded signal and controls the rate at which data is recorded on and recovered from the data storage means with respect to the pre-recorded signal.

6 Claims, 8 Drawing Figures

MAGNETIC DATA STORAGE AND RETRIEVAL SYSTEM

BACKGROUND OF THE INVENTION

1. Field of the Invention

The present invention relates to the field of electronic data recording and playback devices, and more specifically to a magnetic data storage and retrieval system.

2. Prior Art

Throughout the history of systems used for recording and retrieval of electronic digital data, one major difficulty has continued to plague the designers and operators of such systems. This difficulty has been the inability to develop an inexpensive and reliable recording and playback system which can record data at a constant density on the recording media and retrieve the recorded data at a rate equal to the rate at which it was recorded. Such constant density and correct playback speed are needed to prevent errors in both the recording and retrieval. That is, if digital data is recorded at one speed and read at a different speed, the data would no longer be synchronous with the device utilizing the data, such as a digital computer. This asynchronous condition results in the computer accepting one bit of data when it should be accepting a different bit of data which was recorded either earlier or later.

Traditionally, the requirements of constant data density and consistent recording and playback speeds have been met by controlling the motor speed of the associated tape drive mechanism. Such control is typically maintained by an electronic feedback means which monitors the tape drive speed by a motor speed indicator and adjusts the speed based on the monitored information. Thus, in the feedback method of control, an adjustment capability is present in the feedback loop so that the speed of the tape can be accurately adjusted.

However, the prior art devices are subject to several disadvantages. One disadvantage is that the feedback systems are not stable over a period of time so that the motor speed can vary. Such variance can only be eliminated by alignment procedures performed in the field which require the skill of a well-trained technician. The variation in speed can result from a variety of factors including the effects of motor wear and aging, the effects of drive wheel wear and aging, and the variance of electronic components with use. In many prior art devices, this alignment procedure must be performed as often as every two months, causing loss of the use of the recording system until the alignment can be completed.

A second disadvantage of the prior art feedback systems is that they require costly and accurate electric motors with precision machined drive wheels. Such motors must be capable of consistently responding to the changes in speed mandated by the feedback loop. This consistent change in motor speed must then be consistently translated into an accurate tape drive speed by a precision machined drive wheel. If either the motor or the drive wheel fails to accurately respond, the tape drive speed can vary resulting in data errors. A third disadvantage of the prior art recording devices is that the feedback systems used to maintain the motor speed must be complex and therefore costly in order to maintain a constant speed. This problem is further compounded by the necessity in modern computers of fast access time to particular locations on a reel of magnetic tape. Fast access time requires high acceleration of the tape drive unit. However, high acceleration necessitates an even more complex design of the feedback loop so as to prevent instabilities and the corresponding failures of the system.

A second major problem associated with systems used for recording electronic digital data has been the difficulty in indicating to the device using the recording system where various areas are located on the reel of magnetic tape. For example, it is important to indicate to a computer utilizing a tape recording system for data storage where the beginning and end of the tape are located and also where to load data onto the tape. The prior art devices have provided this information to the computer by utilizing magnetic tape which has a small hole through the tape near its beginning and end or has reflective tape portions, and light sensors adapted to sense the passage of the holes or reflected light. However, such sensors are very sensitive to positional changes and thus require frequent alignment procedures.

Accordingly, it is a general object of the present invention to provide an improved data storage and retrieval system.

It is another object of the present invention to provide an improved data storage and retrieval system which is relatively insensitive to variations in the motor speed of the tape drive mechanism.

It is another object of the present invention to provide a relatively inexpensive yet accurate data storage and retrieval system.

It is yet another object of the present invention to provide an improved data storage and retrieval system which is capable of denoting various areas located on a reel of magnetic tape.

SUMMARY OF THE INVENTION

A data storage and retrieval system is provided. The system includes a data storage means, data recording means, data playback means, and a control means. Located on the storage means is a pre-recorded signal, such as a periodic clock signal. The control means is connected to the recording means and the playback means so as to receive the pre-recorded signal from the data storage means and control the rate at which data is recorded on and recovered from the data storage means with respect to the pre-recorded signal. The rate at which data is recorded on and retrieved from the storage means is determined by an enable signal generated by the control means. The enable signal is generated, with respect to the pre-recorded signal, so that the data is recorded on the storage means at a constant density, and is retrieved from the storage means at a rate, with respect to the pre-recorded signal, equal to the rate at which it was recorded. The pre-recorded signal is also encoded so that it denotes various areas on the storage means.

The novel features which are believed to be characteristic of the invention, both as to its organization and its method of operation, together with further objects and advantages thereof, will be better understood from the following description in connection with accompanying drawings in which a presently preferred embodiment for the invention is illustrated by way of example. It is to be expressly understood, however, that the drawings are for purposes of illustration and description only and are not intended as a definition of the limits of the invention.

DETAILED DESCRIPTION OF THE INVENTION

A data recording and retrieval system is disclosed which is adaptable for use with a magnetic tape drive device so as to provide accurate and reliable storage and playback of digital data. The system is generally comprised of a data storage means which has a pre-recorded clock signal imposed thereon, data recording and playback means and a control means. In the presently preferred embodiment, the data storage means is a conventional four channel magnetic tape cartridge which has the clock signal periodically recorded on one of the four available channels and utilizes the other three channels of the cartridge for storage of data signals. The data recording and playback means consists of conventional tape recording and playback heads which couple the clock and data signals to the control means. The control means utilizes the pre-recorded clock signal from the tape cartridge to control the rate at which data is recorded on and recovered from the tape cartridge.

Figure 1:
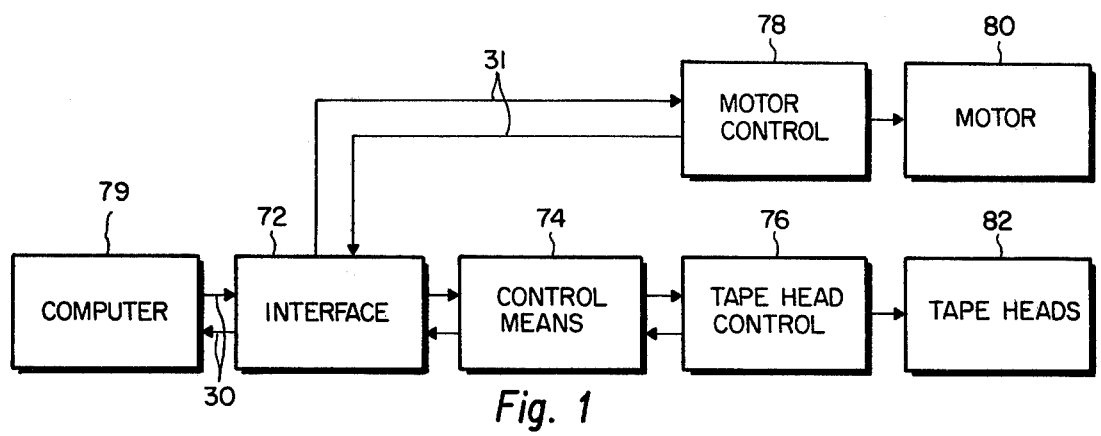
FIG. 1 is a block diagram of the system of the present invention.

Referring to FIG. 1, the data recording and retrieval system is shown in block diagram form. Digital data and other signals from an associated computer 79 are received at lines 30 of interface 72. Interface 72 is coupled to motor control 78 by lines 31 and ultimately to tape drive motor 80. In this configuration, the major functions of the tape drive motor 80 are controlled by the computer 79. Thus, an input signal from the computer 79 may consist of "forward" (and the complement of "forward", "reverse"), "fast" (and the complement of "fast", "slow") and "go" (and the complement of "go", "stop") signals. Motor control 78 receives the signals from interface 72 and regulates current to the tape drive motor 80 to control both its speed and direction. In the presently preferred embodiment, motor control 78 consists of a discretely assembled power amplifier and a pre-amplifier. Some back-EMF is fed back to the amplifier from motor 80 to produce a smoothing effect in the control of motor 80. The desired velocity range of motor 80 is established by supplying the amplifier with a fixed voltage of a magnitude corresponding to the selected speed. Motor control 78 also provides an input to interface 72 indicating the motion of motor 80. This information is passed through interface 72 to the computer 79 by means of lines 30.

Also coupled to interface 72 is control means 74, which, in turn, is coupled to tape head control 76. As will be more fully described below, control means 74 receives a clock signal from tape heads 82 through tape head control 76 and uses this clock signal to control the rate at which digital data from the computer 79 is either recorded on or retrieved from the magnetic tape of the associated tape cartridges. Based on information received from the computer 79 through interface 72, tape head control 76 selects the appropriate tape head 82 and drives tape head 82 to either record data from the computer 79 or channel the playback data into a bias peak detector to determine the content of the recorded data.

Figure 2:
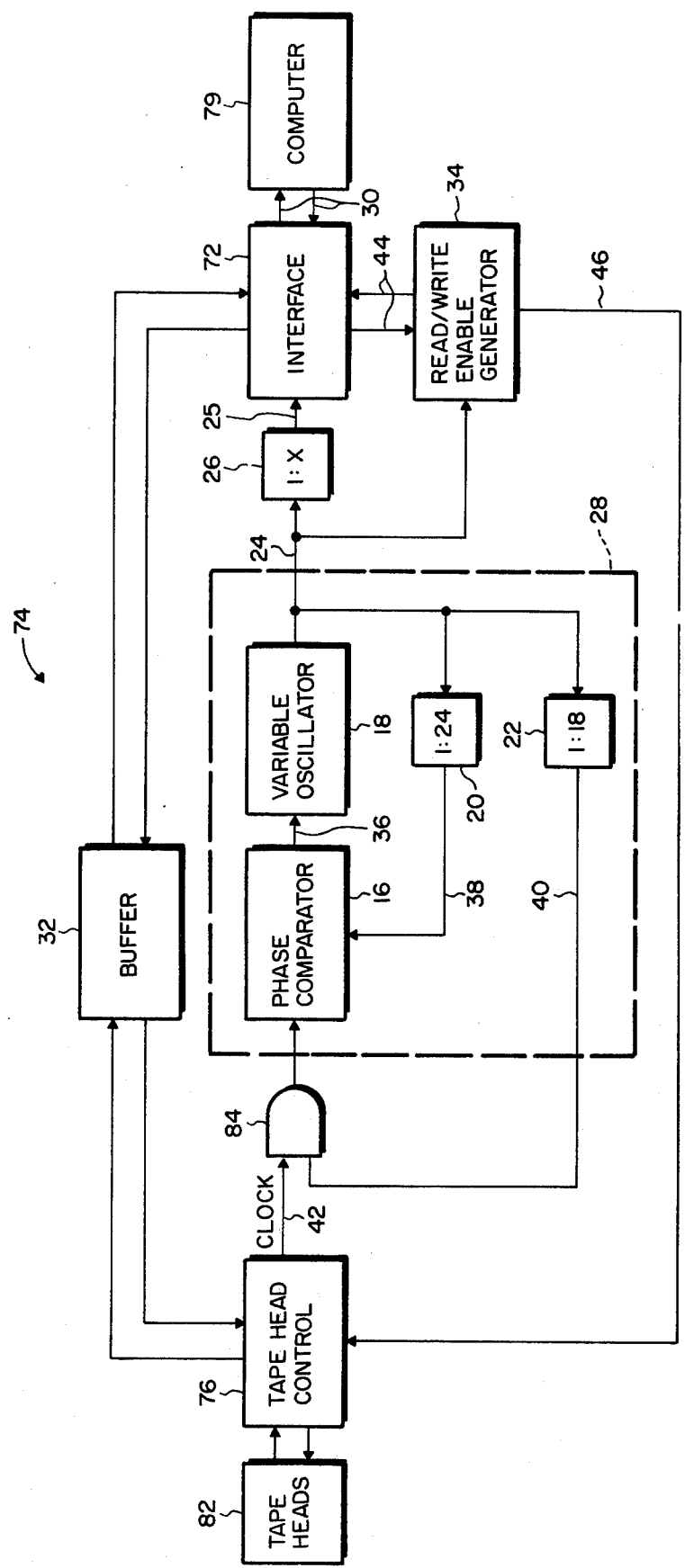
FIG. 2 is a block diagram showing in greater detail the components of the control means of the present invention.

FIG. 2 shows in greater detail control means 74 and its relationship with tape head control 76 and interface 72. As indicated above, tape head control 76 recovers a pre-recorded clock signal 42 from an associated tape cartridge by means of tape heads 82. This clock signal 42 is coupled to phase lock loop 28 which phase locks and frequency locks an output signal 24 to the incoming clock signal 42. Output signal 24 is fed directly to read/write enable generator 34 and is also frequency divided by divider means 26 and fed to interface 72. Interface 72 couples the divided output signal 25 to the computer 79 through lines 30 where it is used to synchronize digital data which is to be recorded or retrieved. Read/write enable generator 34 generates an enable signal 46 which enables the appropriate tape head 82 by means of tape head control 76. When the appropriate tape head 82 is enabled, either data may be recorded on the associated tape cartridge by coupling it from the computer 79 through interface 72 and buffer 32 or data may be recovered from the associated tape cartridge through tape head control 76, buffer 32, and interface 72 where it is available to the computer 79 through lines 30.

Phase lock loop 28 consists of phase comparator 16, variable oscillator 18, dividing means 20 and 22. In operation, the clock signal 42, derived from the pre-recorded signal on the tape cartridge, is fed to the phase comparator 16 where it is compared with the output signal 24 derived from dividing means 20. Phase comparator 16 determines the difference in phase and frequency between the two input signals 42 and 38 and provides an output voltage 36 to variable oscillator 18. Variable oscillator 18 is a voltage controlled oscillator whose frequency responds to changes in input voltage at line 36. In the presently preferred embodiment, phase lock loop 28 is interconnected in a standard configuration so as to develop an output signal 24 whose frequency is 24 times that of the incoming clock signal 42. Output signal 24 is fed back to phase comparator 16 by dividing means 20, where output signal 24 is divided by 24 so as to be the same frequency as clock signal 42. In this manner, phase comparator 16 compares the phase and frequency of signals of approximately the same frequency.

Output signal 24 is also divided by dividing means 22 and fed to AND gate 84 by line 40. Because the signal at line 40 is the result of dividing output signal 24 by 18, while clock signal 42 corresponds to the frequency of output signal 24 divided by 24, the signal at line 40 is only in a high state during a portion of the time that output signal 24 is high. Therefore, AND gate 84 only allows clock signal 42 to pass through AND gate 84 during the time period from the eighteenth to the twenty-fourth oscillation of output signal 24. Thus, in this configuration, phase lock loop 28 is only frequency and phase adjusted during a discrete interval when clock signal 42 is fed to phase comparator 16.

Read/write enable generator 34 receives output signal 24 and counts 18 of the 24 oscillations which occur between clock signals 42 before it generates its output signals 44 and 46. In the presently preferred embodiment, the enable signal at lines 44 and 46 is high for the remaining six oscillations of the output signal 24 before it returns to a low condition. Thus, it can be seen that the phase and frequency of output signal 24 is adjusted so as to be synchronous with clock 42 during the generation of enable signals 44 and 46. In this manner, enable signals 44 and 46 are held in a fixed relationship with the pre-recorded clock signal 42.

Figure 3:
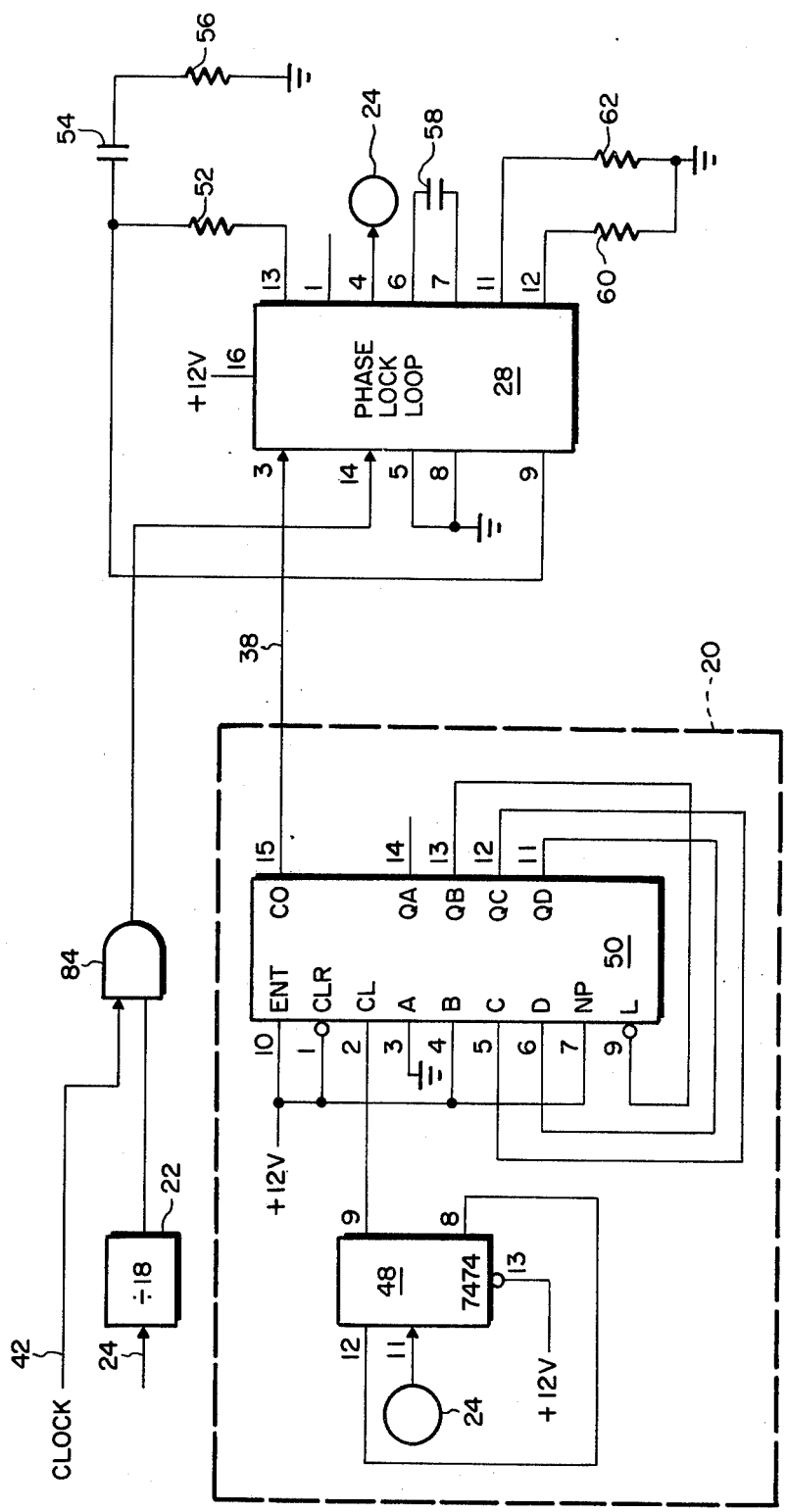
FIG. 3 is an electrical schematic diagram of one portion of the control means of the present invention.

FIG. 3 illustrates the preferred embodiment of phase lock loop 28 and its associated feedback means 20 and 22. Phase lock loop 28 is an MC14046 integrated circuit which contains two phase comparators, and a voltage controlled oscillator. The comparators have two common signal inputs, at pins 14 and 3. At pin 14 is the signal from AND gate 84 whose inputs consist of clock signal 42 and output signal 24 divided by 18 by dividing means 22. By this configuration pin 14 is allowed to receive the clock signal 42 during the period between the eighteenth oscillation of output signal 24 and the twenty-fourth oscillation of output signal 24. The other input of phase lock loop 28 at pin 3 is output 24 divided by 24 by dividing means 20. Of course, other phase lock means may be utilized, including other integrated circuits having self-contained phase lock loop circuits, as well as discrete components coupled together so as to comprise a phase lock loop.

Division means 20 is comprised of integrated circuits 7474, a D-type flip flop, and 74163, a counter circuit. Output signal 24 is fed into pin 11 of flip flop 48, where the frequency of output signal 24 is divided by 2. The output of flip flop 48 is fed into pin 2 of counter circuit 50, which is interconnected so as to divide an incoming signal by 12. Thus, the output pin 15 of counter 50 provides the signal 38 whose frequency is that of signal 24 divided by 24.

One phase comparator located within phase lock loop 28 receives signals at pins 3 and 14 and provides a digital error signal at pin 13 corresponding to the difference in phase and frequency between the input signals. The linear voltage controlled oscillator located within the phase lock loop 28 produces output signal 24 at pin 4 whose frequency is determined by the voltage at pin 9. The digital error signal at pin 13 is coupled to pin 9 and, because the error signal is the result of a comparison between one signal and another signal which is one twenty-fourth the frequency of the phase lock loop output, the voltage controlled oscillator produces an output signal at pin 4 whose frequency is 24 times that of the incoming signal but is still phase and frequency locked to that signal. Capacitor 58 coupled between pins 6 and 7 of phase lock loop 28 and resistors 60 and 62, coupled to pins 12 and 11 respectively determine the frequency offset and range of the voltage controlled oscillator. In the presently preferred embodiment, capacitor 58 is 100 picofarads while resistor 60 is 10,000 ohms. Resistors 52 and 56 and capacitor 54 are configured so as to integrate the phase comparator output at pin 13 before it is fed to the voltage controlled oscillator at pin 9. In the presently preferred embodiment, resistor 52 is 100,000 ohms, resistor 56 is 4,700 ohms and capacitor 54 is 0.1 microfarads.

Figure 4:
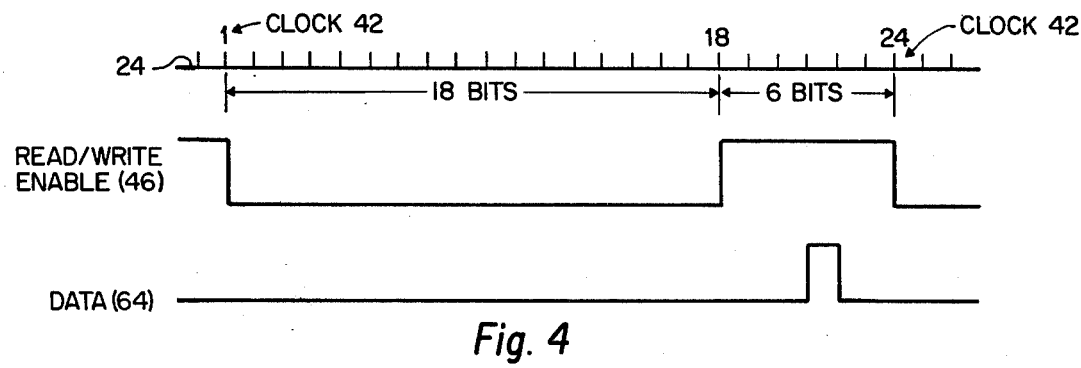
FIG. 4 is a timing diagram showing the relationship between the clock signal, read/write enable signal, and data.

FIG. 4 illustrates the timing relationship between output signal 24, clock signal 42, the read/write enable signal 46 and a data bit 64. Clock pulse 42 occurs at bit 1 of output signal 24 and bit 24 of output signal 24. Thus, it can be seen from FIG. 4 that output signal 24 oscillates 24 times between a first clock pulse 42 and a subsequent clock pulse 42. At the 18th oscillation of output signal 24, read/write enable signal 46 is generated and stays in a high condition for six oscillations until the 24th oscillation of output signal 24 where it returns to a low condition. During this six oscillation period of output signal 24, the read/write enable signal 46 has propagated to both the computer through lines 30 and to the tape head control 76 so that during a write sequence a digital data bit 64 is fed from the computer 79 to the appropriate tape head by tape head control 76 where it is recorded on an associated tape cartridge. Correspondingly, in the read mode, the read enable signal 46 has propagated to the computer 79 through lines 30 and to the appropriate tape head 12 through tape head control 76 where a digital data bit 64 is read from the associated tape cartridge and transferred to the computer 79. Thus, it can be seen, that digital data 64 is either read or written only during a specific time period between clock pulses 42. Thus, there is a fixed relationship between digital data bit 64, its location on the associated tape cartridge, and the pre-recorded clock signal 42. In addition, since clock signal 42 is only allowed to update phase lock loop 28 during the interval between bits 18 and 24, any correction to the phase or frequency of output signal 24 occurs so as to make the enable signal 46 properly correspond to the most current indication of the speed of motor 80.

Now referring to FIG. 5, the lack of influence of a variation in the motor 80 speed and its impact on the data density and data reading procedure is indicated. In FIG. 5a the enable signal 46 and the digital data bit 64 are shown plotted along a time axis. In FIG. 5a digital data bit 64 was written on the tape cartridge at one particular speed of motor 80. In FIG. 5b, the digital data has been read from the tape cartridge when the tape cartridge was moving at a different speed from that when the data was originally written. It can be seen from FIG. 5b that the enable signal 46 occurs at a later point in time in reference to the initial clock 42 bit as compared with the enable signal 46 during the write mode. In addition, FIG. 5b illustrates that digital data bit 64 is also in a different time relationship, with respect to the initial clock bit 42, from that in which it was recorded. In a prior art device, such a discrepancy in time between the writing and reading of a digital data bit would result in an error.

Figure 5A:
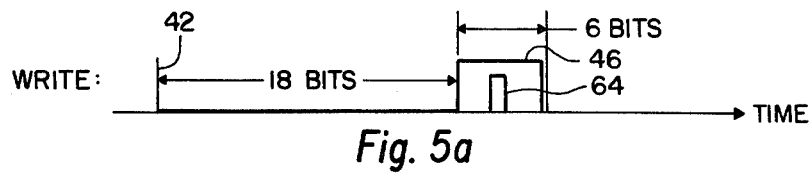
FIG. 5 is a timing diagram showing the relationship between the clock signal, the read and write enable signal and the data.
Figure 5B:
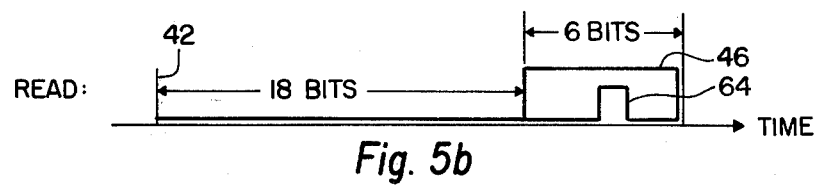
Figure 5C:
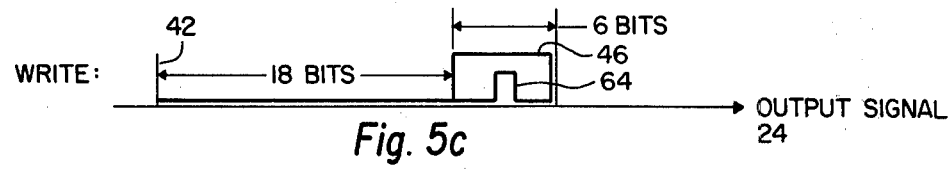
Figure 5D:
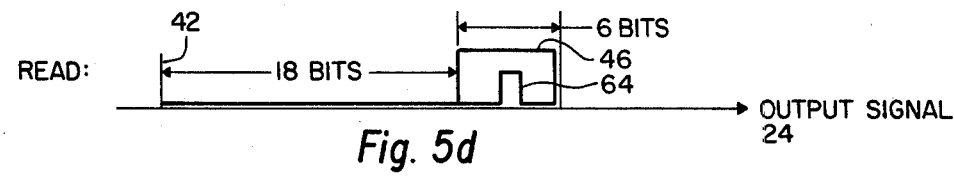

However, FIGS. 5c and 5d illustrate that in the present invention, such a variation in time does not result in an error. In FIGS. 5c and 5d, the same enable signal 46 and digital data bit 64 of FIGS. 5a and 5b are shown plotted along an axis of output signal 24. Because the present invention is phase and frequency locked to the pre-recorded signal 42 on the tape cartridge, the enable signal during the write mode occurs exactly 18 oscillations or bits after the clock pulse 42 and continues for exactly six bits. During this six bit period of the enable signal 46, the digital data bit 64 is written on the magnetic tape. In FIG. 5d the enable signal 46 is again generated during the read mode 18 oscillations after the pre-recorded clock bit has occured. The enable signal lasts for six bits and the data bit 64 is again located within the enable signal 46. Thus, it can be seen from FIG. 5 that even with a variation in motor speed, the data bit 64 has been recovered in precisely the same relationship to the preceeding clock signal 42 as when it was recorded. Therefore, data bit 64 is available for the computer at precisely the correct time so that errors in recording and recovering the digital data is greatly minimized despite variations in the motor speed.

An additional advantage of having a pre-recorded clock signal 42 on the tape cartridge is that this signal can be used to denote various areas on the tape. Thus, in its simplest form, the absence of the clock signal 42 can be used to indicate both the beginning of the tape and the end of the tape. Correspondingly, the presence of the clock signal 42 is detected by the control means 74 and the control means 74 generates a presence signal indicating that clock 42 is present on the tape. Furthermore, the pattern of the clock signal 42 can be encoded so as to indicate areas between the beginning of the tape and the end of the tape. For example, an early warning signal indicating that the end of the tape is approaching may be encoded in the clock signal 42. In the presently preferred embodiment, the clock signal 42 is comprised of a series of seven ones and one zero bits. To denote the early warning portion of the tape cartridge, the eight bits of the clock signal 42 can be encoded in a manner other than the seven ones and one zero. For example, a pattern of four zeros and a four ones can be used to indicate the early warning area. The control means 74 is adapted to detect the encoded pattern of the clock 42 and to generate a corresponding area output. Of course, similar encoding of the eight bits of the clock signal 42 can be used to indicate a great variety of other areas within the tape. In addition, a separate area signal may be imposed on the tape channel where the clock signal 42 is recorded. This area signal can indicate various portions of the tape without interfering with functions of clock signal 42.

It can be seen from the above discussion that the present invention's use of a pre-recorded clock signal allows an inexpensive yet reliable data recording and retrieval system. Because the data recording and playback is always locked to the frequency of the pre-recorded clock signal, the data density recorded and the rate at which the data is read back, with respect to the clock signal, is constant, regardless of the variations in motor speed, within a fixed range. Thus, the feedback loops, expensive motors, and precision machined parts of the prior art devices are eliminated. Furthermore, the alignment procedures of the prior art devices are totally eliminated in the present invention since the present invention continually adjusts its own reading and writing rate so as to correspond to the clock pulses which have been pre-recorded on the cartridge tape.

There has been described herein a new and novel digital data recording and retrieval system. While a specific embodiment of the present invention has been disclosed and described in detail herein, it will be understood by those skilled in the art that various changes in form and detail may be made therein without departing from the spirit and scope of the invention.

I claim:

1. In a multitrack magnetic tape data recording and playback system in which a clock reference signal is prerecorded on one track of said tape, and in which data can be recorded or read back from at least one other track, the improvement comprising:

clock recovery means, including a pickup head associated with said one track, for recovering a clock pulse each time a clock reference signal is sensed by said pickup head, a variable oscillator operating at a frequency higher than the recovered clock pulse rate, phase lock loop means including a divider for dividing the oscillator output by n, where n is the nominal multiple of the clock pulse rate at which said oscillator operates, and a phase comparator for comparing said recovered clock pulses with the output of said divider, said comparator providing in response to such comparison an error signal to said variable oscillator to adjust the frequency thereof until said oscillator frequency is n times that of the recovered clock pulse rate, enable gate means, responsive to the output pulses from said oscillator, for providing a read/write enable signal beginning a first fixed number of oscillator output pulses after occurrence of a recovered clock pulse and ending at a second fixed number of oscillator output pulses after occurrence of a recovered clock pulse, and tape head control means for enabling data to be recorded on or read back from said at least one other track at any time during occurrence of said read/write enable signal, but at no other time.

2. A magnetic tape system as defined in claim 1 further comprising:

a tape record head associated with said at least one other track, a source of data to be recorded on said tape, said source receiving said read/write enable signal and in response thereto providing said data to said tape record head via said tape head control means for recording on said other track within the time duration of said read/write enable signal.

3. A magnetic tape system as defined in claim 1 further comprising:

a tape playback head associated with said at least one other track, a utilization device for utilizing data read from said tape, interface means for coupling data read from said other track via said tape playback head, said tape head control means and said interface means to said utilization device only when enabled by said read/write enable signal.

4. In a multitrack magnetic tape data recording and playback system in which the drive speed of said magnetic tape may vary considerably, said tape having a clock signal pre-recorded on one track thereof, the improvement for recording data with constant density regardless of drive speed and for reading data from said tape at a rate that is uniform with the pre-recorded clock signal, comprising:

read/write enable window means, frequency locked to the pre-recorded clock signals recovered from said tape, for establishing a fixed number of subintervals between consecutive recovered clock signals and for providing an enable signal having a duration equal to a certain number of said subintervals and beginning a fixed number of said subintervals after occurence of each recovered clock signal, and tape head control means, cooperating with said window means, to enable reading or writing of data to or from said tape at any time within the duration of each enable signal, but at no other time, and wherein said read/write enable window means comprises:

a phase locked loop including a voltage controlled oscillator, a divider for dividing the oscillator output pulses by n, where n is the nominal multiple of the clock signal rate at which said oscillator operates, a tape head for detecting said pre-recorded clock signals from said tape, said phase locked loop being responsive to the phase difference between the output of said divider and the recovered clock signals obtained via said tape head and utilizing said phase difference to lock said oscillator to a frequency n times that of the clock signal rate, said oscillator output pulses establishing said subintervals, and gate means for generating said enable signal by counting said oscillator output pulses to ascertain both the beginning time and duration of said enable signal.

5. A system according to claim 4 wherein said clock signal comprises pulses periodically spaced on said tape, and wherein certain areas on said tape are designated by a code of "missing" clock signal pulses, said voltage controlled oscillator remaining at a substantially unchanged frequency during the time between recovery of the clock signals just preceeding and following said "missing" clock pulses, together with control means for detecting said code and producing in response thereto a tape-area-designating signal.

6. In a multitrack magnetic tape data recording and playback system in which the drive speed of said magnetic tape may vary considerably, said tape having a clock signal pre-recorded on one track thereof, the improvement for recording data with constant density regardless of drive speed and for reading data from said tape at a rate that is uniform with the pre-recorded clock signal, comprising:

read/write enable window means, frequency locked to the pre-recorded clock signals recovered from said tape, for establishing a fixed number of subintervals between consecutive recovered clock signals and for providing an enable signal having a duration equal to a certain number of said subintervals and beginning a fixed number of said subintervals after occurrence of each recovered clock signal, and tape head control means, cooperating with said window means, to enable reading or writing of data to or from said tape at any time within the duration of each enable signal, but at no other time, said read-/write enable window means comprising:

a phase locked loop including a voltage controlled oscillator, a divider for dividing the oscillator output pulses by n, where n is the nominal multiple of the clock signal rate at which said oscillator operates, a tape head for detecting said pre-recorded clock signals from said tape, said phase locked loop being responsive to the phase difference between the output of said divider and the recovered clock signals obtained via said tape head and utilizing said phase difference to lock said oscillator to a frequency n times that of the clock signal rate, said oscillator output pulses establishing said subintervals, and gate means for utlizing said oscillator output pulses to generate said enable signal, and further comprising:

a second divider for frequency dividing the oscillator output pulses to obtain a synchronization clock pulse train, computer means for providing data to be recorded on said magnetic tape and for receiving data read from said tape, interface circuitry for interfacing said computer means with said tape head control means and said read/write enable window means, said interface circuitry being connected to said second divider means so as to provide said synchronization clock pulse train to said computer means, said computer means utilizing said clock pulse train for synchronization of data to be recorded on or retrieved from said tape within the duration of each enable signal.

* * * * *